Sept. 6, 1938.  A. HAKANSON  2,129,322
ARTICLE DISPENSING MECHANISM
Filed July 7, 1937  8 Sheets-Sheet 6

INVENTOR
A. Hakanson
BY
Morgan Finnegan & Durham
ATTORNEY

Patented Sept. 6, 1938

2,129,322

UNITED STATES PATENT OFFICE 2,129,322

ARTICLE-DISPENSING MECHANISM

Alfred Hakanson, North Arlington, N. J., assignor to Peerless Weighing and Vending Machine Corporation, Long Island City, N. Y., a corporation of Delaware Application July 7, 1937, Serial No. 152,347

7 Claims. (Cl. 312—68)

The invention relates to novel and useful dispensing mechanism and more particularly to improvements in manually selective, article-dispensing means, preferably but not necessarily associated with a coin control.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The invention is directed to providing improvements in article-dispensing mechanisms, the several combined improved features thereof providing a highly useful, simple, durable and attractive unit for dispensing articles to the public. The invention relates to that class of dispensing machines wherein a supply of several different articles or different varieties of the same article are separately stored and any variety of the articles may be selected and delivered by the operator. The dispensing and selecting mechanism is preferably, but not necessarily, associated with coin controlled means whereby the desired article will be rendered free for delivery only upon the depositing of a proper coin.

The invention provides that any one of the several varieties of articles carried by the machine may be selected for delivery after a coin has been deposited. Having once selected a particular article, however, the machine automatically prevents delivery of any except the article selected, unless the supply of such article is exhausted, whereupon the operator may choose and receive a different article.

A primary object of the invention is to provide a dispensing mechanism which will be as simple, rugged and "fool-proof" as possible in construction and operation. Accordingly numerous safeguards are provided for insuring prompt and certain delivery of the selected article by the simplest and most direct operation of the device. At the same time means are provided for preventing tampering with the machine to secure more than one article for a single coin; to prevent damage to the more delicate parts of the mechanism by idle operation of the device; and also to provide prompt return of the operator's money or opportunity to select a second article if the supply of any one article is exhausted. In this latter connection the invention provides that upon the single deposit of a coin the operator may select any one of the several types of articles in the machine and if the supply of the articles first selected is exhausted may also secure any one of the other articles from an unexhausted supply while the coin is still in the machine. However, if the operator wishes his money back before any selection is made or upon discovery that the supply of a particular article is exhausted, the return of the money may be effected promptly and easily.

Other features of the invention include novel and improved means for mounting and assembling the various parts to facilitate access to the machine for removing coins and for resupplying articles and for varying or interchanging the supplies of the several articles.

It will be understood that the foregoing general description and the following detailed description as well are exemplary and explanatory of the invention but are not restrictive thereof.

Figure 1:
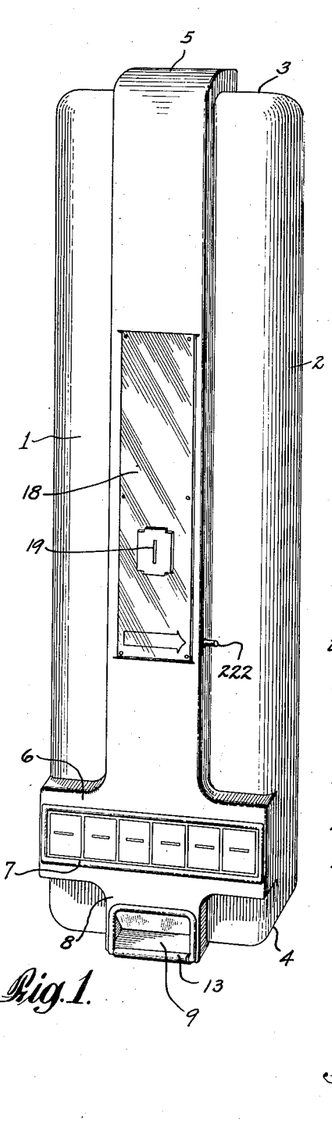
Fig. 1 is an external front perspective of a mechanism embodying the invention.
Figure 2:
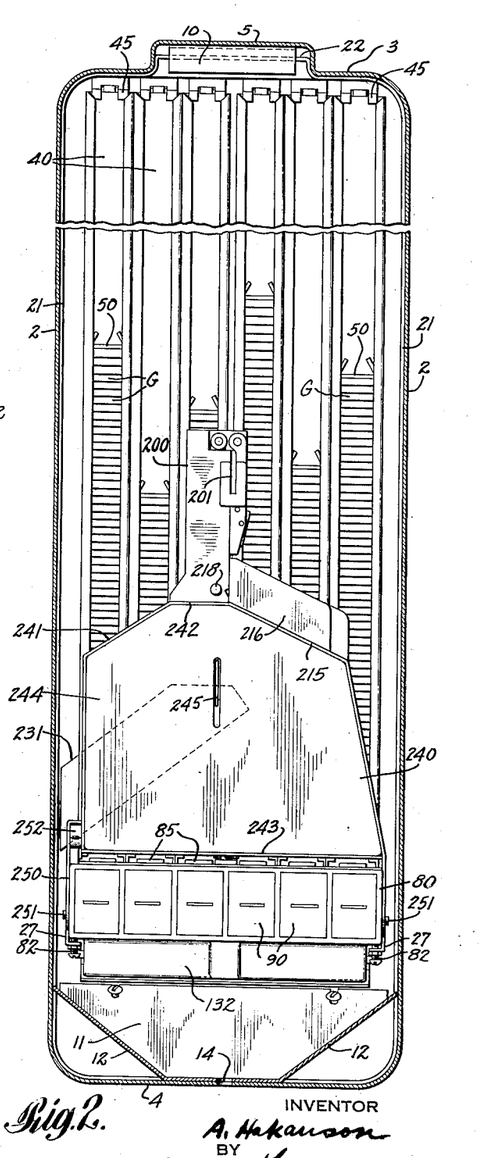
Fig. 2 is an enlarged front elevation of the mechanism shown in Fig. 1, the casing being shown in section.
Figure 3:
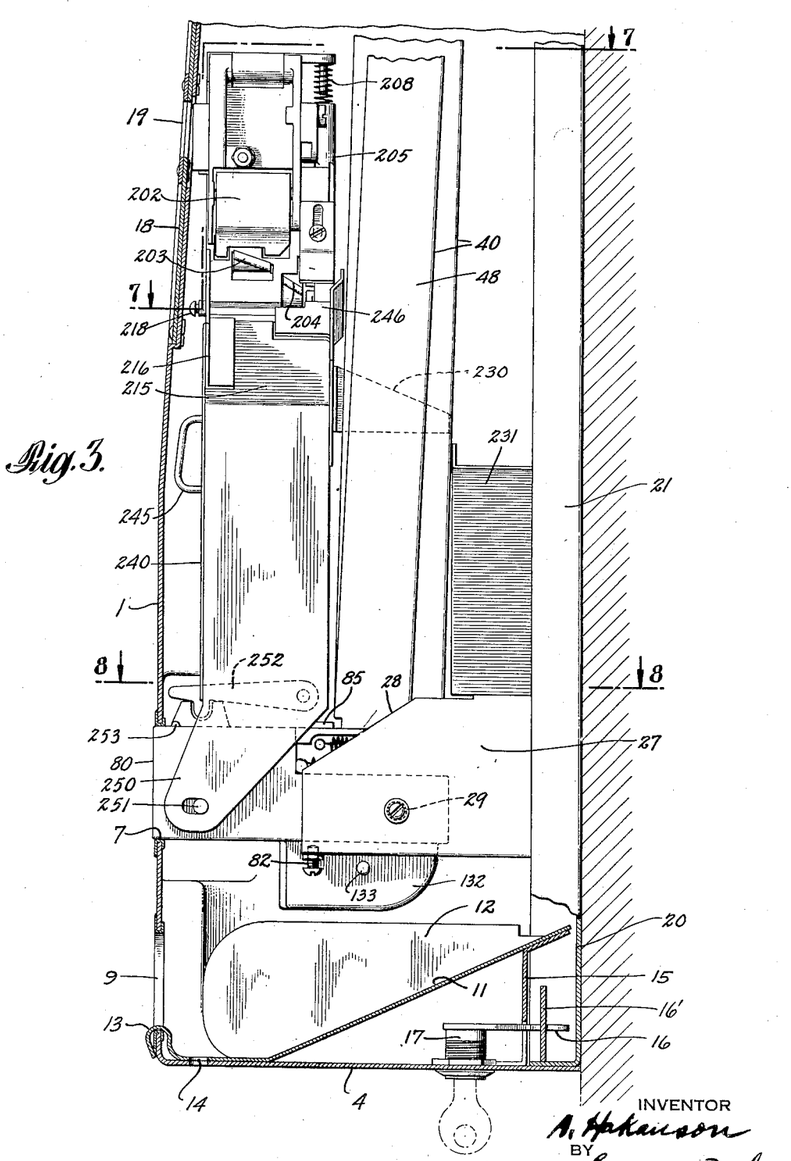
Fig. 3 is a side elevation of the lower portion of the mechanism shown in Fig. 2, portions of the casing being broken away to show the coin control mechanism and other interior elements of the machine.

Referring now in detail to the present preferred embodiment of the invention, the invention comprises several major constructional units or groups of mechanism which will be briefly pointed out prior to describing each unit in detail. These constructional units may be designated as the casing or housing for the entire machine, marked 1 in Figs. 1 and 4; the main supporting rear frame 20 (Fig. 3); the group of article-stacking magazines or chutes 40 (Figs. 2 and 5); the selectively operable article-dispensing and ejecting mechanism generally marked 80 in Fig. 3 and shown in considerable detail in Figs. 8 to 15; and the coin selecting means and depositary generally marked 200 (Figs. 2 and 3).

Referring now to the outer casing or housing 1, same is preferably an integral metal stamping substantially rectangular in general outline having a flat face 1, flat vertical sides 2, flat top 3 and bottom 4. The edges between the main surfaces mentioned are preferably rounded as shown to give a pleasing contour and to avoid sharp corners. Primarily for purposes of design and appearance the central longitudinal portion 5 of the top 3 and face 1 may be raised above the general level of those surfaces. Toward the bottom of the casing the raised portion 5 is widened at 6 into a cruciform shape extending to the side edges 2 of the casing. A rectangular opening 7 extends substantially across the surface 6 to provide for the outer face of the ejecting mechanism 80, as hereinafter described. The lowermost, narrowed portion 8 of the raised member 5 is provided with a rectangular orifice 9 for the withdrawal of articles ejected from the magazines by the dispensing mechanism.

Referring to the interior construction of the casing 1 (Fig. 4), a U-shaped channel or receptacle 10 is provided within the rear top part of the raised member 5 for attaching the top of the casing to a suitable projection on the back supporting frame. As a guiding chute to cause articles dispensed from the magazines to slide downwardly and forwardly toward the dispensing orifice 9, a false bottom is mounted in the casing, comprising the forwardly and downwardly inclined surface 11 and the inclined side surfaces 12. A curved lip 13 on plate 11 may be provided to overhang the bottom edge of the orifice 9. A hole 14 in plate 11 and the bottom 4 of the casing may be provided for drainage near the opening 9. The rear upper edge of the plate 11 is supported from the bottom 4 by a suitable bracket 15. A pivoted hook 16 may be mounted on the bottom 4 and extends rearwardly to an opening in the bracket 15 to cooperate with a latch 16' on the rear frame 20. A key-operated lock 17 is preferably provided with the hook 16, thereby forming a strong and theft-proof attachment of the casing about the machine and to the frame 20. The front of raised member 5 may be recessed to receive a rectangular mirror or other decorative construction plate 18, and a coin slot 19 may be conveniently provided therein.

Referring now to the main supporting frame same comprises a shallow rectangular flanged plate 20 having upstanding flanges or edges 21 adapted to fit just inside the conforming rear edges of the main casing 1. An upstanding projection 22 in the top flange is adapted to fit inside the raised portion 5 and within the U-shaped fastening channel 10, thereby to hook the top of the casing 1 into place. For supporting the dispensing mechanism 80 and the article magazines resting thereupon, a rectangular bracket is fixed to plate 20 and extends forwardly therefrom. Said bracket comprises a rear plate 24, an overlying horizontal top 25 and a downwardly and inwardly extending flange or lip 26. Side arms 27 extend horizontally forwardly from the bracket for about two thirds the width of the entire machine, being bevelled at 28 on their upper edge and provided with opposite openings 29 for pivotally supporting the dispensing mechanism as hereinafter described.

The invention provides a group of magazines or chutes 40 in which the articles to be dispensed are stacked. In accordance with the invention said chutes are fairly loosely mounted with respect to the machine frame so as to permit ready removal and interchangeability of the several magazines. As shown, each of the magazines 40 comprises an open-faced rectangular channel having flat sides and a flat back, the top and bottom being open. The front edges of the sides are flanged inwardly at 41 to partly enclose the open face of the magazine, the open space between the flanges 41 being slightly less in width than the articles to be stacked therein. As shown, the mechanism is adapted to contain and dispense superposed, flat rectangular packages of chewing gum G, or articles of similar shape, which may be loosely stacked in the magazines 40 by loading from the top. For this purpose the upper edges of the flanges 41 are bevelled at 42 to permit ready loading of the magazines. The interior dimensions of the magazines are preferably slightly greater than the outer dimensions of the package of gum or other article to be dispensed, so that the articles will travel freely downward by gravity.

The embodied means for removably supporting the plurality of parallel magazines 40 in the machine comprises a series of spring tongues or clips 45 which extend from the top of the plate 20 and loosely engage the top edges of the magazines 40. The magazines have a slight forward and downward inclination, the bottom edges of the magazines 40 being adapted to rest upon the upper surface of the dispensing mechanism 80 and said edges are provided with suitable tongues 46 which are adapted to loosely project into conforming slots in the dispensing mechanism 80, as will hereinafter appear.

Because of the relatively loose and simple mounting of the magazines, they may be very readily removed and interchanged with each other as when it is desired to interchange the position of different stacks of gum or other articles in the machine. The invention also provides for supporting magazines of different depths and widths, for articles of smaller or greater dimensions than the standard article being dispensed.

Figure 7:
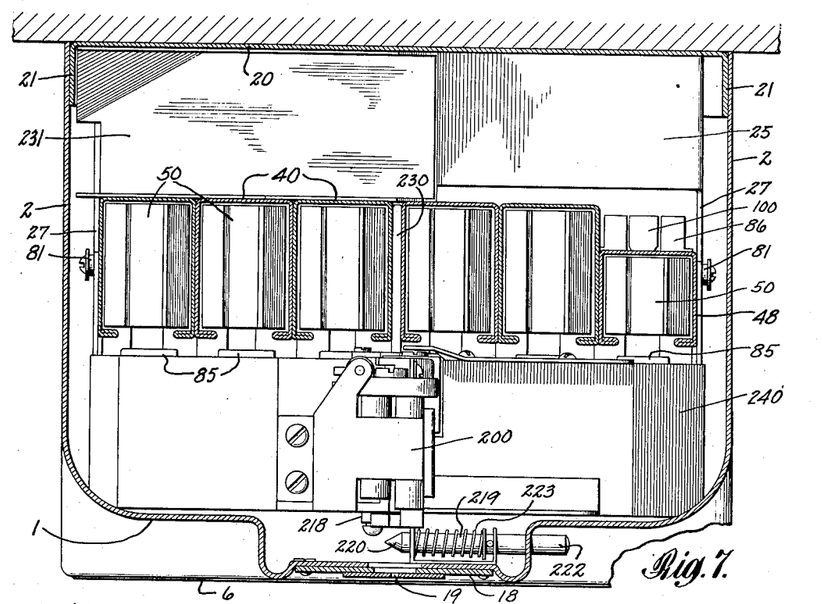
Fig. 7 is a horizontal section taken on line 7—7 of Fig. 3.
Figure 8:
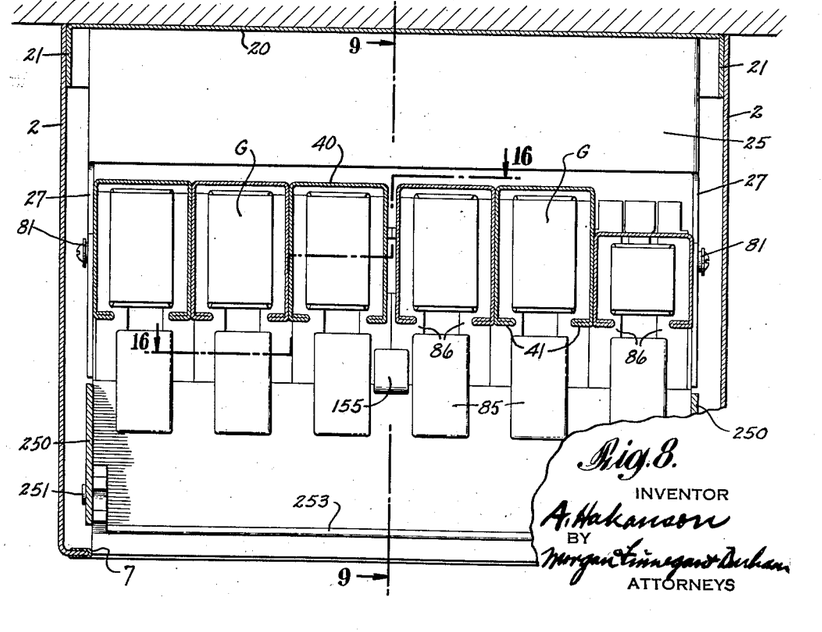
Fig. 8 is a horizontal section taken on line 8—8 of Fig. 3.

For example, in dispensing gum, the majority of magazines may be of dimensions for a standard size and shape of gum packaged, while one or more of the magazines, such as 48 (Fig. 7) may be of a smaller cross section to receive smaller pieces of gum, such as "P-K" package. Thus if it is desired to provide more than one magazine with the "P-K" or other non-standard size of gum that may be done merely by installing more than one of the smaller size magazines 48, for example. While six article magazines are shown it will be understood that the invention is not limited to that or any other particular number, either greater or less.

Referring now to the embodied means for selectively ejecting and delivering articles stacked in the magazines 40, a main casing 80 for said mechanism extends horizontally below the lower end of the magazines 40, being pivotally supported by trunnions 81 which project from the ends of the side walls 42 of the casing. Said trunnions 81 are rotatably mounted in the openings 29 in the arms 27 of the rear supporting bracket. A limited rocking movement about the trunnions is permitted by the stop screws 82 which extend upwardly from the bottom flanges of the arms 27 thereby permitting an adjusting movement of the device for assembly purposes. The forward portion of the unit 80 comprises a hollow rectangular housing, the front end of which extends into and is supported upon the bottom edge of the opening 7 of the main casing.

Figure 9:
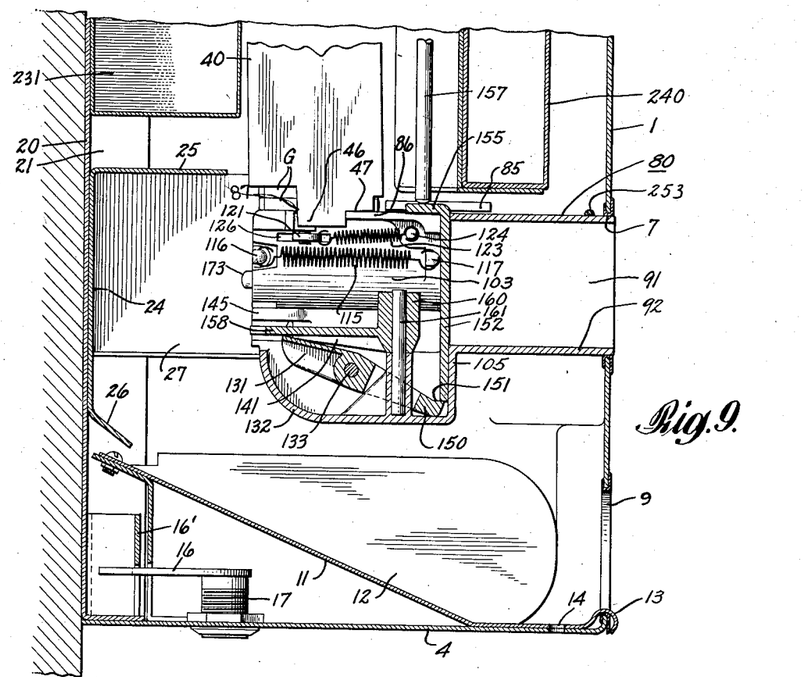
Fig. 9 is a transverse vertical section on line 9—9 of Fig. 8.
Figure 10:
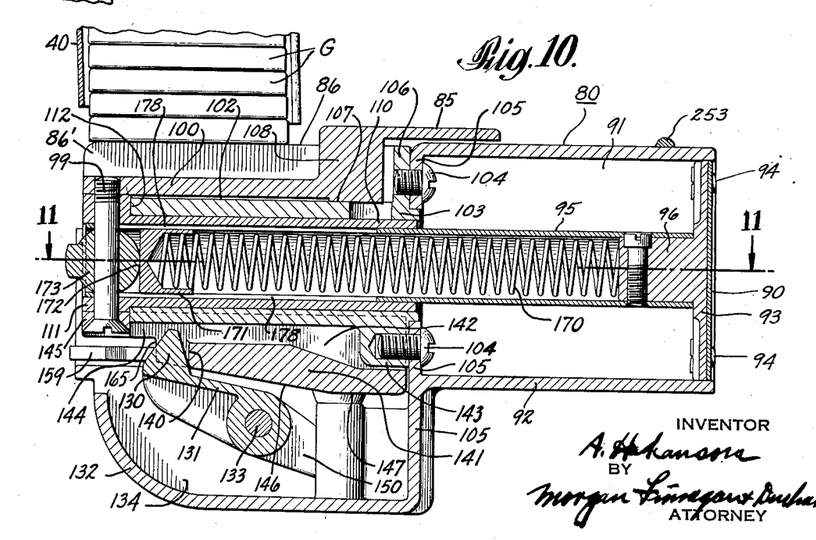
Fig. 10 is an enlarged central, vertical section of the central portion of Fig. 9.

The article-ejecting and delivery unit is provided with ejecting devices for removing the lowermost article of the stack in a magazine 40 and discharging it into the delivery chute 11—12. As embodied, a plurality of article-ejecting plates 85 are slidably mounted above the top of casing 80, each such ejecting plate being movable horizontally rearwardly to push the lowermost article G of the stack rearwardly for discharge into chute 11—12. The bottoms of magazines 40, and the stack of articles G therein, are supported on bridge plates 86 which extend rearwardly from casing top 80 and at the same level so that the ejector plates 85 may travel thereabove. Suitable notches 87 in the sides of each bridge plate 86 loosely receive the tongues 46 of the magazines 40 so that the bottom edges 47 rest upon and are supported by the bridge plates 86. As shown in Figs. 9 and 10, the bottom of magazine 40 is designed to permit entry of the article-ejector 85 and to permit rearward discharge of an article displaced by the ejector. Accordingly the bottom portions of the flanges 41 of the magazines are cut away at 47' to clear the lowermost article G and permit free entry of the ejector 85. The rear portion of the magazines 40 is cut away to a somewhat greater height at 49 to provide free clearance for ejected articles. It will be clear, therefore, that rearward movement of the ejector plate 85 between and above the bridge plates 86 will displace the lowermost article G rearwardly until it falls over the rear edge of the bridge plate 86. The trailing portion of the ejector 85 meanwhile supports the article G next above, so that said article remains above the bridge plate 86 until the ejector has returned to its forward position.

The invention provides means for preventing rearward movement of an ejector plate 85 unless at least one article G is in the corresponding magazine 40. As embodied each magazine has a loose guard plate 50 (Figs. 2 and 6) which normally rests upon the uppermost article G in a stack and acts as a floating weight which follows down on top of the diminishing stack and keeps the articles beneath it flat and parallel. The plate 50 is of substantially the same dimensions as the article G so that it rides freely up and down in the magazine. For preventing rearward movement of the ejector 85, the guard plate 50 is provided with upstanding, inwardly inclined flanges 51 which project above the plate for a substantial distance. Thus when the last article G in any stack has been ejected the guard 50 will slide into lowermost position and the flanges 51, abutting against the rear wall of the magazine, will prevent ejectment of the guard 50 and thus bar any rearward movement of the ejector 85.

The invention provides means for manually moving a selected ejector 85 rearwardly to eject the lowermost package of gum, or other article G from the corresponding magazine 40. As the several ejectors and associated operating mechanisms are identical, the details of only one will be described. As shown, movement is transmitted to the ejector plate 85 by a thumb-operated pusher plate 90 which is housed in the casing 80 and is flush with the outer surface 6 of the machine, extending through the opening 7 therein. The forward portion of casing 80 is chambered by vertical walls 91 and bottom plate 92 to slidably house the rectangular pusher plate 90. The outer surface of the plate 90 is preferably detachable from a backing plate 93, as by split pins 94, and carries suitable indicia representing the type of gum or other contents of the corresponding article magazine 40. Thus changes in the magazine contents can be readily labeled on the interchangeable pusher plates 90.

Figure 16:
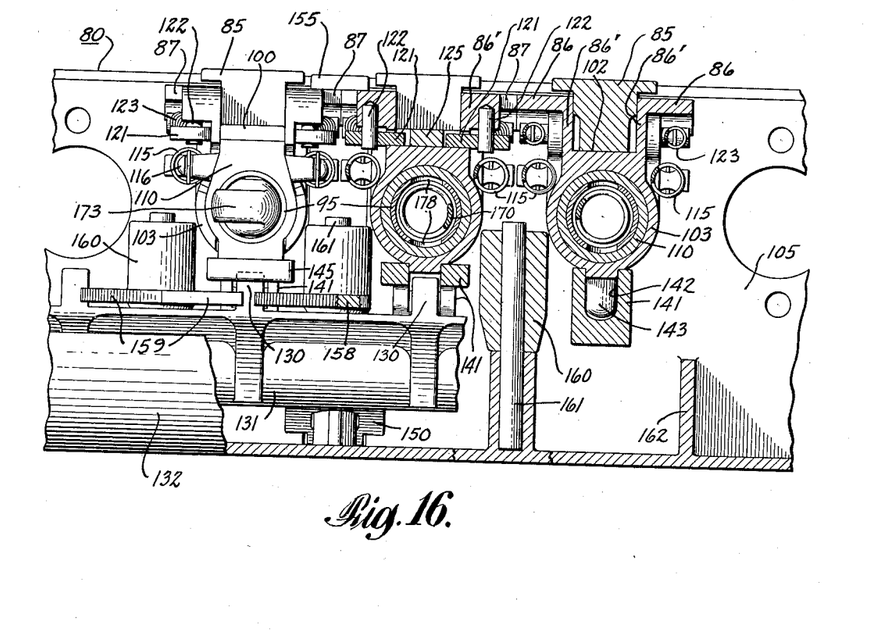
Fig. 16 is a fragmentary vertical section taken on line 16—16 of Fig. 8.
Figures 17, 18:
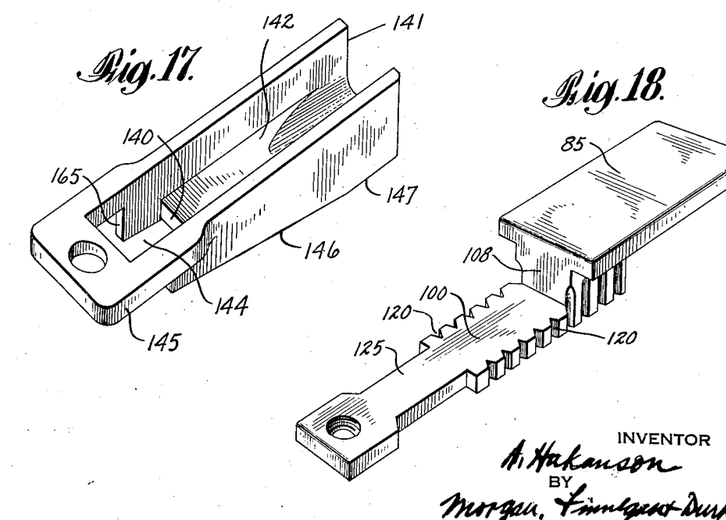
Figs. 17 and 18 are perspective views of the latch-depressing member and of the ejector plate respectively.

The embodied means (Figs. 10 and 16) for transmitting movement from plate 90 to ejector 85 comprises a tubular plunger 95 suitably fixed to backing plate 93 by a cylindrical stem 96 integral with the backing plate and fitting into the outer end of the tube 95. The rear portion of tube 95 is slidably fitted within an outer tube 110 which normally is adapted to move with the plunger tube 95. The rear end of outer tube 110 is enlarged at 111 to receive a vertical bolt 99 which passes through the rear end of both tubes. The bolt 99 serves to connect the tubes 95 and 110 to the ejector plate 85 by means of a tongue 100 in which the upper end of bolt 99 is fixed by a threaded connection. The tongue 100 constitutes a lower rearward extension of the ejector plate 85, integrally connected to said plate by a vertical arm 108. As shown, the tongue 100 lies substantially below the plane of the ejector plate 85 so as to clear the bottom of the stack of articles G, which lie on the upper surface of the bridge plates 86.

The embodied means for supporting and housing the tubular plungers 95 and 110 and the parts movable therewith comprise a cylindrical casing 103, the forward wall 106 thereof being fixed to the transverse wall 105 of the casing 80 by bolts 104 (Fig. 10). The upper surface 102 of the casing 103 is flattened to form the bottom of a trackway or channelway between the spaced-apart bridge plates 86 which thus form upstanding horizontal flanges at the tops of the vertical walls 86' which rise from the main body of the cylindrical casing 103. The flat surface 102 serves as a slidable support for the tongue 100 and ejector plate 85, the bottom surface 107 of the arm 108 being adapted to travel upon said surface 102, between walls 86'. Thus it will be seen that tongue 100 is adapted to reciprocate along plate 102 in a channelway between and below the upstanding bridge plates 86, and to cause ejector 85 to travel above said channel to eject articles G which rest upon the surfaces of the spaced bridge plates 86 and overlie the tongue 100.

The ejector plate 85, pusher plate 90 and their associated parts are normally urged toward the forward or non-ejecting position, wherein the plate 90 is flush with the front edge of casing 80 as shown in Fig. 10. Resilient means for urging bolt 99, tongue 100 and tube 110 forwardly comprise two helical springs 115, hooked at their rear ends to notched ears 116 which extend laterally from the enlarged head 111 of tube 110. The forward ends of springs 115 are hooked over fixed studs 117 projecting from the front wall 106 of the casing 103. Thus the springs 115 lightly urge forwardly the tube 110, bolt 99, tongue 100, tube 95, plate 90 and ejector 85 until the head 111 of tube 110 abuts against the end 112 of casing 103, as shown in Fig. 10.

Means are provided for insuring that the operator will continue pushing a selected pusher plate 90 rearwardly until the limit of the ejecting movement, thus to prevent starting with one selection and then changing to another. As embodied, the side edges of the tongue 100 are notched at 120 from the arm 108 forwardly to a reduced portion 125 to provide a two-way ratchet. Suitable pawls 121 are pivotally mounted to cooperate with the ratchets 120 preferably on either side of tongue 100. Said pawls are journalled on pins 122 seated in the overhanging bridge plates 86 and extend through slots 126 in the walls 87. Suitable springs 123 are connected at one end to the pawls 121 and at the other end to fixed studs 124 which project from the rear portion of plate 86. Thus on a rearward stroke the pawls 121 will prevent the tongue 100 from moving forward once the ratcheted portion 120 is engaged by the pawls. Upon completion of the rearward stroke, the pawls will swing into the space behind vertical arm 108 and thereby move into position to act with the notches 120 on the return stroke of the tongue 100. Thus the return stroke of an ejector must also be carried to completion as the ratchet mechanism prevents any reversal during the return stroke. A similar reversing movement of the pawl to its original position is effected by the reduced portion 125 at the rear part of tongue 100.

The invention comprises means for permitting a selected pusher plate 90 and ejector 85 to move rearwardly only when released by control means, such as a coin-control. Coordinated therewith are means, hereinafter described, for preventing any but the selected pusher and ejector from moving, once the selection is made. Accordingly all the pushers and ejectors are normally restrained from rearward movement by individual latches 130 mounted on the rear end of a common, pivoted lever plate 131. The plate 131 is positioned in a casing 132 below the plunger casings 103, said casing 132 constituting a rearward and lower extension from wall 105 of the main casing of unit 80. The plate is journalled on axles 133 which are horizontally disposed and fixed in the end plates 134 of the casing 132. The rear wall of casing 132 is curved upwardly to guard the lower part of the mechanism from access or tampering by any one reaching through the opening 9.

The latches 130 are adapted to cooperate with means connected to and movable with the pusher 90 and ejector 85. As shown, an abutment 140 is adapted to contact with and be restrained from rearward movement by the latch 130. Said abutment 140 constitutes a recessed end surface of a channeled member 141 which member is fixed to the bottom of the cylindrical casing 103 by the head of the vertical bolt 99, countersunk in its outer end 145, so that said member 141 is adapted to travel with the tube 110 and the parts movable therewith. The upper surface of the member 141 is channeled at 142 and a longitudinal projection 143 formed on the bottom of the fixed casing 103 fits into said channel and guides the movement of the member 141. The bottom of the member 141 is apertured at 144 between the abutment 140 and the end portion 145 in which the head of bolt 99 is countersunk. Said opening 144 is adapted to receive the end of latch 130 when same is in its upper or latching position, bearing against abutment 140, as shown in Fig. 10.

The invention provides means for depressing the latch 130 and lever 131 therewith upon rearward movement of the pusher plate 90 and ejector 85. As embodied, the forward face of latch 130 is inclined upwardly and rearwardly, while the lowermost edge of the abutment 140 is chamfered or inclined relatively to the contiguous face of the latch or detent hook 130, so that an initial rearward movement of the member 141 will initiate a prompt depression of the lever 131, provided same is free to rock about the axle 133. Further rearward movement of the member 141 is designed to cause a relatively slower depressing of the lever 131 and for this purpose the bottom surface of member 141 to the front of the abutment 140 is inclined downwardly and forwardly on a relatively gentle angle at 146. The slope 146 terminates in the horizontal bottom surface 147 near the forward portion of member 141.

Means are provided for maintaining the latches 130 in their uppermost or locking position (Figs. 9 and 10) except when the lever 131 is released for rocking movement about the axle 133. As embodied, the lever 131 is provided with a central, forwardly disposed arm 150 which extends nearly to the wall 105 at the front of the subcasing 132. The slightly inclined upper end surface 151 of said arm 150 is adapted to support and cooperate with a vertically movable control member 152 which is mounted to travel vertically in a notch 153 formed in the upper part of the rear wall 105 of the casing 80. The upper end 155 of control member 152 is bent horizontally rearwardly to receive and support the lower end of a vertical control rod 157, which rod may be connected with suitable coin-controlled mechanism or other desired means for controlling the operation of the selective dispensing mechanism. As will hereinafter appear the rod 157 is urged downwardly by suitable means, such as a spring associated with the coin-controlled mechanism, so that the normal position of the parts is that shown in Figs. 9 and 10, the rod 157, control member 152 and lever arm 150 being in their lowermost position, and in such positions acting to hold the latches 130 against the abutments 140 and thereby prevent rearward movement of any of the pusher plates 90.

Figure 11:
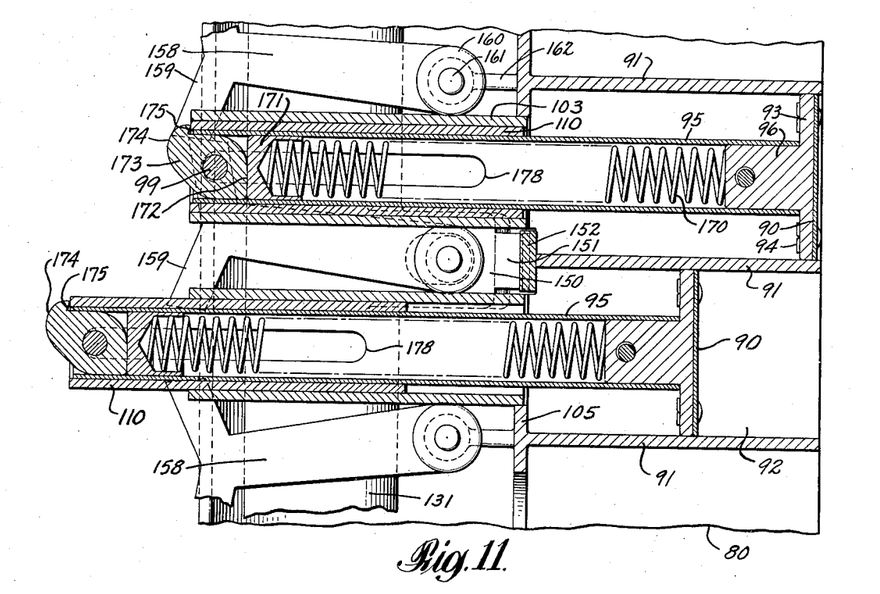
Fig. 11 is a horizontal section on line 11—11 of Fig. 10.
Figure 12:
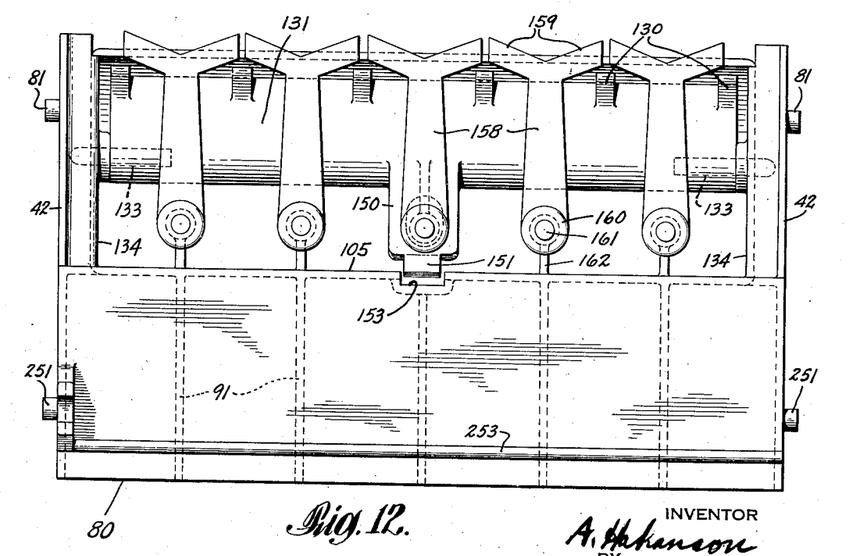
Fig. 12 is a plan view of the dispensing and ejecting unit casing with the ejecting members removed.
Figure 13:
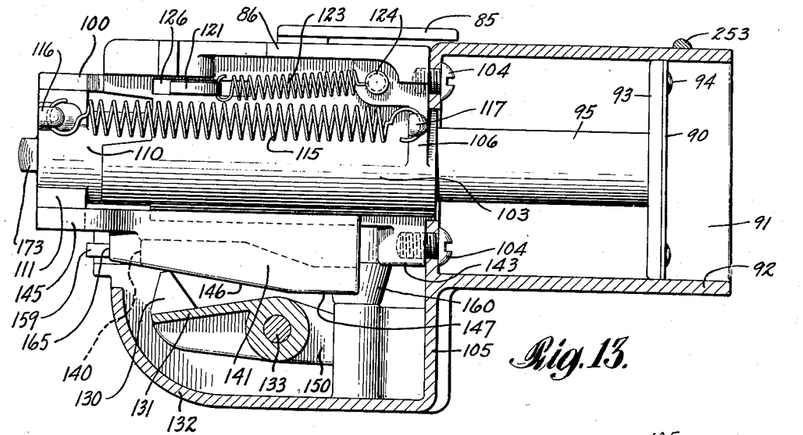
Fig. 13 is a transverse vertical section through the dispensing mechanism showing one of the dispensing units in elevation.
Figure 14:
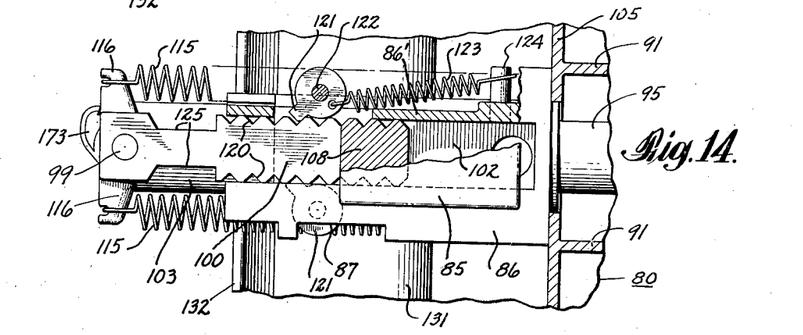
Fig. 14 is a detail in plan of a dispensing unit with parts broken away to show the two-way ratchet construction.

The invention further comprises means for permitting only the single, selected pusher plate 90 and ejector 85 to move rearwardly to eject an article from the corresponding magazine 40, the other ejectors and pusher plates being held from rearward movement, even after the latches 130 have been depressed. As embodied a plurality of Y-shaped interponents, comprising pivoted stems 158 and inclined arms 159, are horizontally disposed to lie between each two of the ejector units. As shown, each stem 158 is provided with a vertically extending hub 160 at its forward end, said hub being loosely journalled on an upstanding shaft 161 which is fixed to the rear wall 105 of casing 80 by a web 162, whereby the shaft 161 lies in the space between the forward edge of lever 131 and the wall 105. As will be clear from Figs. 11 and 12, the ends of the Y arms 159 are normally spaced apart a slight distance while at either end of the unit, a greater space is provided between the end walls 134 and the flank arms 159. As shown in Fig. 11, rearward movement of an ejector plate and its associated parts will cause the normally spaced interponent arms 159 on either side of the ejector to be moved farther apart, the chamfered ends 165 of the members 141 being adapted to engage the rear inclined edges of the arms 159 and push them apart, as shown in Fig. 11. The separation at the ends of the adjacent arms 159 is sufficient to permit rearward movement of the member 141 and the parts movable therewith. However, the displacement of the adjacent arms 159 causes their companion pieces to contact with and push aside the other arms 159 on the adjacent stems 158. Thus all of the stems 158 are caused to swing laterally one way or the other, thereby interposing their arms 159 across the pathways of the other members 141. Consequently, when any one pusher plate 90 is moved rearwardly a distance sufficient to bring the ends 165 of the members 141 against and past the separated arms 159, said arms will lock any of the other ejector mechanisms from rearward travel so long as the ejector mechanism selected remains in the extended position.

Figure 15:
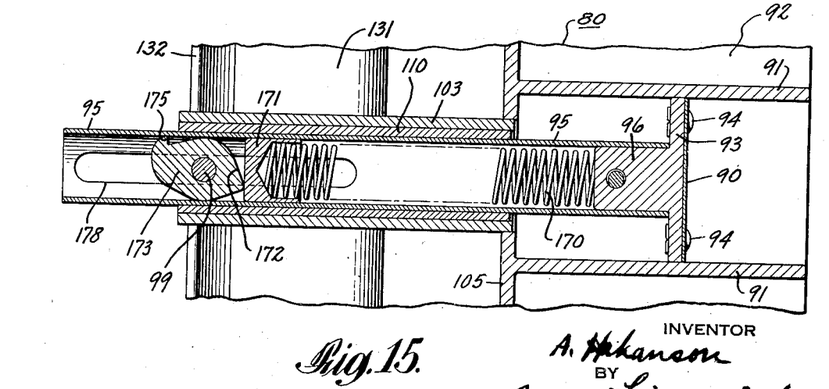
Fig. 15 is a central, vertical longitudinal section through Fig. 14.

The invention comprises means for protecting the more delicate parts of the mechanism from jamming or destructive forces, such as might occur when an operator attempted to force operation of the mechanism, without supplying a coin to the coin control. More particularly means are provided for preventing transfer of unusual stresses to the coin control rod 157 and its connected parts upon an attempted forcing movement of the pusher plate 90, at a time when said coin control rod 157 is not free to move upwardly, that is, when no coin has been deposited in the coin control mechanism. As embodied, said protecting means comprise devices for permitting a short idle movement of a pusher plate 90 and of the plunger tube 95, without transmitting said movement to any other parts of the ejector mechanism which are normally movable therewith. As shown in Figs. 10, 11 and 15, the tube 95 is provided with a helical compression spring 170 which extends for the greater portion of the length of the tube and at its rear end is seated in a cylindrical cap 171, slidably mounted within the tube 95 near the rear end thereof. The rear face of cap 171 is adapted to bear against the flat surface 172 of a rotary locking member 173 which lies within the rear end portion of tube 95 and is vertically journalled to pivot about the vertical bolt 99. The rear end or face of the locking member 173 is rounded at 174 to form a shoulder 175 which normally overlaps the contiguous ends of the tubes 95 and 110. Thus it will be clear that the expanding pressure of spring 170 normally urges the locking member 173 to remain in the position shown in Fig. 11, whereby the tubes 95 and 110 are locked together and travel as a unit, so that movement of the plunger tube 95 is transmitted directly to the tube 110 and thereby to the ejector plate 85.

However, when the tube 110 and its associated parts, including the member 141, are locked against rearward movement by the coin control member 157, or otherwise, the tube 95 is adapted to move rearwardly independently of the tube 110 when sufficient pressure is exerted upon pusher plate 90. For this purpose tube 95 is provided with two opposed and relatively long axial slots 178 in its upper and lower surfaces. The rear ends of said slots terminate short of the rear end of tube 95 and in normal position are adapted to lie against the vertical bolt 99. The width and positioning of the slots is such as to permit relative movement of the tube 95 with respect to the vertical bolt 99. Thus when the tube 110 is locked against such rearward movement, upon forcing the pusher plate 90 rearwardly, the pressure of the rear end of tube 95 against the shoulder 175 on locking member 173 will cause said member to rotate against the spring pressure of cap 171 and eventually to clear the ends of the tubes 95 and 110. Thereupon the tube 95 is free to move rearwardly with respect to the tube 110 and without transmitting any of its movement to the remainder of the ejecting mechanism (Fig. 15).

Referring now to those parts of the invention relating to coin control, selection and disposal, as hereinbefore explained the vertical control rod 157 is adapted to be regulated in its vertical movement by any suitable coin-operated controlling means or other type of control. The present invention is not limited to any particular form of coin control mechanism but may be used with any suitable or known form thereof. As shown, the coin selecting and detecting mechanism generally indicated at 200 is of the form shown and described in my copending application Ser. No. 152,346, filed as of even date herewith. Generally speaking said mechanism comprises a coin slot 201 opposite slot 19 in the main casing, from which the coin travels past a number of "bad coin" detecting and arresting devices generally indicated by the numerals 202 and 203, the "good" coin arriving at an actuating station 204 where it is in position to cooperate with the vertically movable control rod 157. A vertically movable frame 205 is adapted to be moved upwardly a limited distance by the control rod 157 in order to actuate the coin detecting and arresting devices 202 and 203 to discharge any "bad" coin arrested thereby. Said movement causes the pivotally mounted member 202 to swing outwardly, and the member 203 and other coin arresting devices to retract, so that the bad coins will drop out of the selector mechanism and be discarded. Further upward movement of the control rod 157 may take place only when a good coin is positioned in the actuating station 204 whereupon the vertically movable frame 205 may be moved for a full stroke upwardly with the control plunger 157. Said final upward movement of the frame 205 and control plunger 157 corresponds to the travel of the upper end of latch 130 along the inclined bottom surface 146 of the member 141 of the ejecting mechanism. Thus the selected ejecting mechanism can only be moved rearwardly to eject an article when a good coin is in the actuating station 204 of the coin-operated device.

A limited rearward movement of the pusher plates 90 is permitted to effect discharge of bad coins arrested by the devices 202 and 203 and this limited movement corresponds to the downward travel of latch 130 from the position shown in Fig. 10 until the upper end of the latch underlies the beginning of the sloping surface 146. The same period of idle rearward movement of the ejecting mechanism is permitted by the reduced portion 125 of the tongues 100 before engagement of the pawl 121 in the first of the notches 120. Similarly this initial coin-discharging movement of the control rod 157 corresponds to the initial travel of the members 141 before the ends 165 thereof contact and push aside the interponent arms 159.

Any upward movement of the coin-control rod 157 is opposed by the helical spring 208 at the upper portion of the coin-control mechanism, which spring resists upward movement of the frame 205. Thus the rod 157 and the control member 152 are normally held in their lowermost position and are returned thereto promptly during the return stroke of the ejector, thereby to hold the latches 130 in their uppermost or ejectment-barring position.

The invention comprises means for disposing of bad coins or other articles rejected by the coin-selecting device; for returning good coins to the operator at his option; and means for storing and safe-guarding good coins which have been used to effect discharge and delivery of a selected article. As shown, bad coins which are cleared and discharged from the coin-selecting mechanism 200 by actuation of the members 202 and 203 or the like will fall vertically downward and into a chute comprising the sloping bottom 215 and the side walls 216. Thence the bad coin will drop into the chute 11—12 and be returned to the operator.

Figures 4, 5, 6:
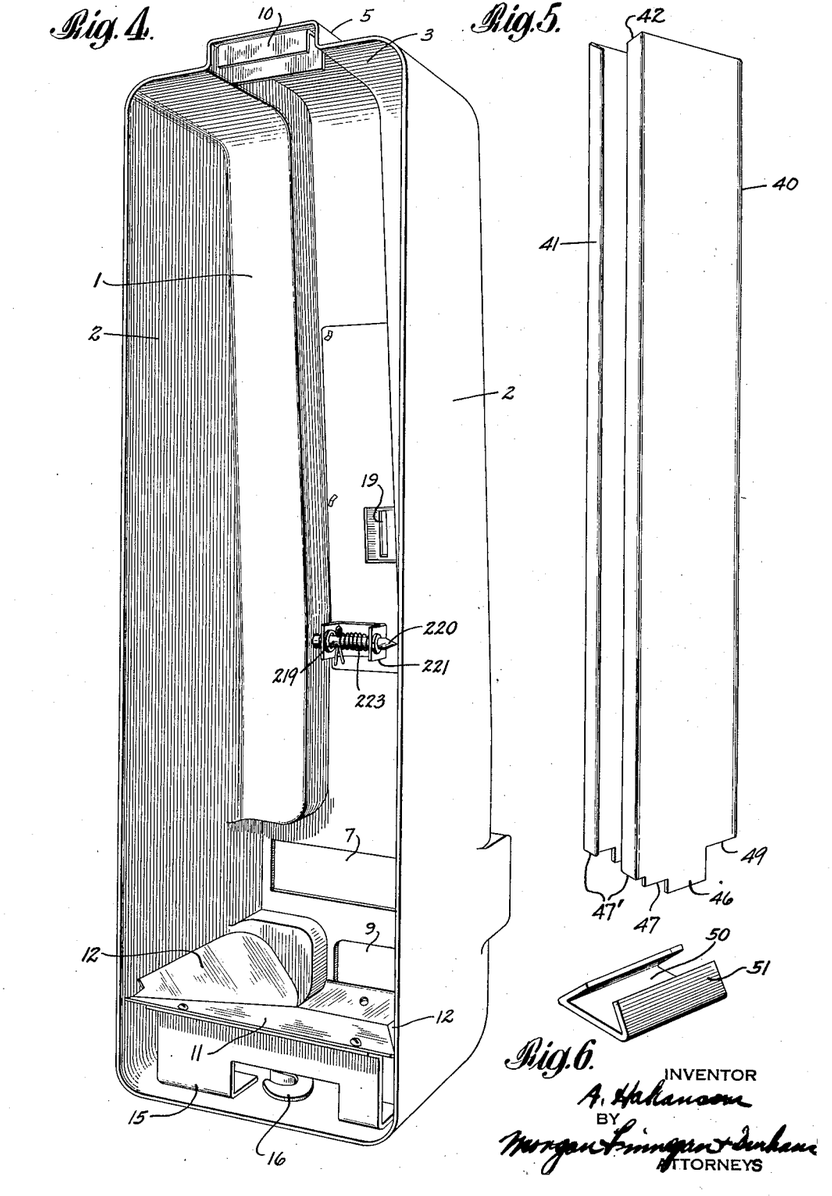
Fig. 4 is a rear perspective of the interior of the outer casing.
Fig. 5 is a detail in perspective of one of the removable chutes or magazines for holding articles to be dispensed.
Fig. 6 is a detail in perspective of a floating guard member.

The embodied means for optionally returning good coins after they have reached the actuating station 204 and have not yet been used to effect dispensing of an article comprises means for tilting the coin retaining member 204 to permit the good coin to roll rearwardly out of the actuating station. Such means, not shown herein in detail, comprise a pusher rod 218 extending from the front of the coin-control unit and suitably connected to the member 204, as more fully shown and described in my copending application herein referred to. Means for permitting optional manual actuation of said coin-releasing rod 218 comprises a horizontally disposed pusher rod 219 having a bevelled end 220 adapted to contact with and move the pusher rod 218. Said rod 219 is horizontally mounted in a bracket 221 inside the raised portion 5 of the casing 1, so that the end 222 thereof projects for easy manipulation by the operator (Figs. 1 and 4). A suitable return spring 223 may be mounted on the rod 219 to normally hold same away from the pusher rod 218.

Coins released by the actuation of pusher rod 218 are adapted to roll rearwardly out of the selector unit 200 and into the space between two adjacent magazines 40. A suitable spacer tongue 230 may be attached to the coin selector unit to extend between and space apart the adjacent magazines to provide a pathway for the released coin. Said tongue 230 thus forms the bottom of a coin chute between the sides of the adjacent magazines 40. A suitable coin return chute 231 may be mounted on the rear wall 20 of the machine frame to receive the released coin and guide it into the final return chute 11—12.

The embodied means for receiving and storing good coins which have been used to effect actuation of the dispensing mechanism may comprise a generally rectangular strong box 240 having inclined upper surfaces 241 and 215 and a flat top 242 upon which the coin selecting unit is conveniently mounted. The flat bottom 243 of the strong box is adapted to lie slightly above the top plate of the dispensing unit 80. The strong box is preferably provided with a removable drawer comprising the front plate 244 and side, bottom and top walls adapted to fit inside the casing 240. A suitable spring latch 245, or other closure, may be provided for the drawer. It will be understood that upward actuating movement of the frame 205 will operate to eject the good coin from the actuating station. A suitable trap door 246 formed in the top 215 of the strong box is also actuated simultaneously to open and admit the ejected good coin.

In accordance with one feature of the invention the coin-selecting unit 200 and the strong box therewith are movably supported with respect to the dispensing unit 80 and the article magazines 40, so as to permit more ready and complete access to the latter two units. As embodied, the box 240 is supported from its sides on vertical side brackets 250 which are pivotally journalled on studs 251 projecting from the end walls of the unit 80. A suitable latch 252 may be provided for releasably holding the unit 200 and box 240 in the normal upright position shown in Figs. 2 and 3. When the casing 1 is removed, release of the latch 252 will permit the units 200 and 240 to be swung downwardly and forwardly to clear the entire portion of the mechanism normally covered thereby. A bead 253 across the top of the unit 80 and inside the casing provides a weather seal and a guard against pilfering or tampering with the ejector devices from the front.

Operation of the major functions of the invention will now be described. Upon deposit of a good coin in the coin slot 19, the coin travels through the selecting mechanism 200 and into the actuating station 204. When in said station, the coin permits full upward movement of the vertical frame 205 of the coin mechanism and therewith the coin-control rod 157, the control member 152 and the lever arm 150. Hence when an operator pushes in on any one of the thumb plates 90, the latch 130 may be fully depressed by rearward movement of the member 141, thereby permitting a complete rearward stroke of the ejector plate 85. The lowermost package of gum or other article G will be carried rearwardly by the rear edge of ejector plate 85 and will be forced backwardly and fall upon the projecting surface of the tongue 100 which thus forms a temporary support for the displaced article. Upon return of the tongue 100 with the pusher plate 90 to initial position, the article is forced off the retracting tongue by the rear ends of the walls 87 and falls onto the delivery surfaces 11—12 whence it may be removed by the hand of the operator through opening 9. As already described, the rearward movement of the member 141 separates the two contiguous interponent arms 159, whereby to block movement of any other one of the pusher plates 90, once the plate selected has begun its ejecting movement. Also the pawls 121 require that the operator complete the full rearward and return strokes of the ejector, as previously described. If there are no articles remaining in the magazine selected, the plate 50—51 will block ejecting movement of the corresponding plate. The operator may then select another ejector, or at his option may get back the coin by pushing rod 222.

If an operator should attempt to obtain articles without putting a good coin in the coin slot, the latch 130 will prevent sufficient rearward movement of the ejector mechanism, because the control rod 157 and vertical frame 205 cannot make a full upward movement unless a coin is in the actuating station 204. A partial idle movement of any one of the ejectors is permitted, as hereinbefore described, and said partial movement will effect opening and retraction of the coin arresting devices 202, 203, etc. Thus if an operator attempts to eject articles by means of a bad coin, the initial movement of the pusher plate 90 will clear the coin selector of the bad coin, which will be returned to the operator through the chute 215 and opening 9, and any attempt to force the ejector beyond the initial position described will cause the plunger 95 to slip by the latch 175, thus resulting in an idle movement of the plunger.

The invention in its broader aspects is not limited to the specific mechanisms shown and described but departures may be made therefrom within the scope of the accompanying claims without departing from the principles of the invention and without sacrificing its chief advantages.

What I claim is:

1. In an article dispensing mechanism operated through coin-controlled means, in combination, a magazine adapted to contain articles to be dispensed, an ejector and supporting means along which it is movable to eject an article from the magazine, means normally holding said ejector in retracted position, means actuated by the coin-controlled means for causing the holding means to release the ejector, a customer-operated actuator for the ejector, and a mechanical connection between the actuator and ejector for causing them to move together when the ejector is free to move, said connections including a yieldable device for permitting independent movement of the actuator when the ejector is held against movement.

2. In an article dispensing mechanism operated through coin-controlled means, in combination, a magazine adapted to contain articles to be dispensed, an ejector and supporting means along which it is movable to eject an article from the magazine, means normally holding said ejector in retracted position, means actuated by the coin-controlled means for causing the holding means to release the ejector, a customer-operated actuator for the ejector, and a mechanical connection between the actuator and ejector for causing them to move together when the ejector is free to move, said connections including a coil spring compressible by the movement of the actuator to effect independent movement of the actuator when the ejector is held against movement.

3. In an article dispensing mechanism operated through coin-controlled means, in combination, a magazine adapted to contain articles to be dispensed, an ejector and supporting means along which it is movable to eject an article from the magazine, spring means continuously impelling the ejector toward its retracted position, means normally holding said ejector in retracted position, means actuated by the coin-controlled means for causing the holding means to release the ejector, a customer-operated actuator for the ejector, and ejector operating connections from the actuator including a compressed coil spring interposed between them to move the ejector, said spring being further compressible to permit independent movement of the actuator.

4. In an article dispensing mechanism, in combination, a magazine adapted to contain articles to be dispensed, guideways beneath the magazine, an ejector device reciprocable in the guideways and having an article engaging plate above the guideways and a body part located between the guideways, said body part having an internal, longitudinally-disposed opening, a reciprocable actuator for said ejector device, and connections between the actuator and the ejector device comprising a coil spring located within said opening and placed under compression by the reciprocable actuator to move the ejector, said connections permitting movement of the actuator independently of the ejector.

5. In an article dispensing mechanism, in combination, a magazine, guideways beneath the magazine, an ejector device reciprocable in the guideways and having an article engaging plate above the guideways and a body part located between the guideways, said body part having an internal, longitudinally-disposed opening, a reciprocable actuator for said ejector device, and connections between the actuator and the ejector device comprising a spring located within said opening and acted on by the reciprocable actuator and a detent located between the actuator and ejector and actuated by increase in compression of said spring to disconnect the actuator and ejector to permit independent movement of the actuator.

6. In an article-dispensing mechanism, in combination, a magazine for articles to be dispensed, a reciprocable ejector for ejecting articles from the magazine, an actuator for the ejector, means for normally restraining the ejector from operation, said means including a hook movable to engage and disengage the ejector, there being an inclined surface on the ejector with which said hook cooperates to permit movement of the ejector before the hook is fully retracted.

7. In an article-dispensing mechanism, in combination, a plurality of magazines containing articles to be dispensed, an ejector for each magazine, movable to eject an article from the magazine, a detent for each ejector normally holding it in retracted position, means for causing all the detents simultaneously to release their ejectors, a customer-operated actuator for each ejector, means brought into operation when actuation of one actuator is begun for preventing any other of the ejectors from being operated by its actuator, and connections between each actuator and its ejector for operating the ejector, said connections including a device for permitting an actuator to be operated independently when its ejector is held from operation by said preventing means.

ALFRED HAKANSON.